Nov. 26, 1929.　　　A. U. AYRES　　　1,737,137
CENTRIFUGAL MACHINE
Filed Feb. 15, 1928

Inventor
Arthur U. Ayres
By his Attorneys
Kenyon & Kenyon

Patented Nov. 26, 1929

1,737,137

UNITED STATES PATENT OFFICE

ARTHUR U. AYRES, OF PHILADELPHIA, PENNSYLVANIA, ASSIGNOR TO THE SHARPLES SPECIALTY COMPANY, OF PHILADELPHIA, PENNSYLVANIA, A CORPORATION OF DELAWARE

CENTRIFUGAL MACHINE

Application filed February 15, 1928. Serial No. 254,437.

This invention relates to centrifugal machines and more especially to that type of centrifugal machine in which the bowl is suspended and rotated by an overhead spindle.

When a centrifugal bowl so supported is rotated the lower end thereof tends to move in a plane transverse to the geometrical axis of the bowl.

An object of this invention is to provide novel and improved means, commonly called a "drag assembly", whereby such lateral motion of the lower end of a centrifugal bowl so supported may be permitted but resisted yieldingly and limited and whereby substances may be introduced to such a bowl, such means having provision, if desired, for draining substances flowing from the bowl after it ceases rotation and for draining the bowl enclosure or support.

In the practice of this invention a so-called "drag" acts upon the lower part of the bowl and preferably upon a tubular boss or the like through which substances may be fed to the bowl. The drag includes a guiding member preferably composed of self-lubricating material that engages the bowl or the tubular boss and moves laterally with it but is held by spring pressure in frictional engagement with a surface or between surfaces substantially normal to the axis of rotation of the bowl, and the drag includes means for positively limiting the extent of the lateral movement of the guiding member that is so resisted frictionally. A further feature of this invention is that the assembly in which the guiding member is mounted, commonly called the "drag assembly", includes a nozzle discharging a substance into the tubular boss of the bowl and so positioned as to avoid the spilling upon the guiding member of a substance introduced into the bowl. A further feature of this invention is that the drag assembly includes an inlet leading to the nozzle and adjustable as to position in order to connect up properly with supply pipes coming from different directions, and includes drain openings for the discharge of the contents of the bowl after it stops rotating and for the discharge of substances collecting in the enclosure surrounding the bowl, such openings being so arranged that their point of discharge is not greatly varied by adjustment of the position of the inlet.

Figure 1:
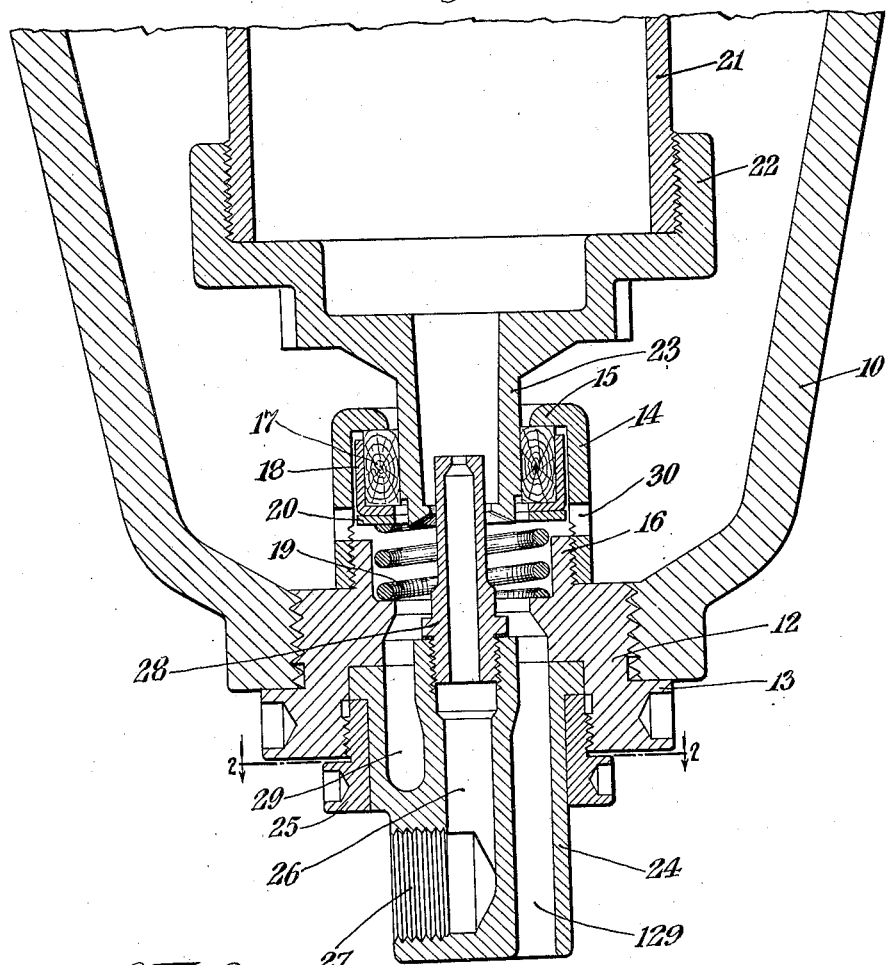
Figure 2:
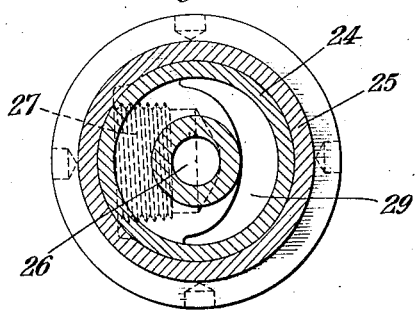

Other objects, novel features and advantages of the invention will be apparent from the following specification and the accompanying drawings wherein, Fig. 1 is a broken vertical sectional view taken through the bottom of a centrifugal machine embodying the invention; and Fig. 2 is a sectional view on line 2—2 of Fig. 1.

The mechanism illustrated in the drawing comprises casing 10 having bottom aperture 11 in which is threaded annular plug 12 provided with flange 13 which engages casing 10.

A shell 14 having an inturned flange 15 is threaded on a tubular projection 16 arising from the top of the plug 12. Within the shell is arranged a guiding member 17, which is preferably of some self-lubricating material or wood impregnated with a lubricant. This guiding member is mounted in a metal ferrule 18 having an aperture in the bottom thereof. A helical spring 19 has its lower end resting on a shoulder provided within the tubular projection 16 and its upper end engages a washer 20, which in turn engages the bottom of the ferrule 18. The guiding member 17 is pressed upwardly by the spring 19 into contact with the flange 15. The dimensions of the ferrule 18 are such that it is allowed a limited lateral play within the shell.

A bowl 21 suspended and rotated by an overhead spindle (not shown) has a cap 22 threaded on its lower end. This cap is provided with a tubular boss 23 which engages within the guiding member 17, and extends through the bottom of the ferrule 18 and the washer 19. The boss 23 may be inserted in or removed from the guiding member by moving the bowl 21 vertically, or the drag may be removed from the casing while the boss and bowl are suspended in position in the casing 10.

A connector or inlet member 24 has one end seated in a socket in the plug 13 and is held in position by means of a collar 25 threaded into the plug 13 and engaging a shoulder provided on the inner end of the connector. The connector is provided with a central passage 26 which terminates in a socket 27. A nozzle 28 is threaded into the inner end of the connector in communication with the conduit 26 and extends into the boss 23. The nozzle 28 is of less diameter than the interior of the boss 23, so that there is provided an annular space between the two, thus permitting lateral movement of the boss relative to the nozzle. A substantially annular chamber 29 in the connector 24 communicates with the space between the nozzle 28 and the inner surface of the plug 13. Drain outlet 129 leads downwardly from chamber 29.

Fluid is introduced into the bowl through a feed pipe (not shown), the end of which is threaded into the socket 27, and the fluid passes upwardly through the conduit 26 and nozzle 28 into the bowl 21. Chamber 29 and outlet 129 form a drain for fluid left in the bowl at the end of a run. Apertures 30 are provided in shell 16 so that any liquid collecting in the casing 10 may drain into chamber 29. By means of the drains thus provided, bowl drainage as well as leakage runs off freely without contaminating the boss or the guiding member and thereby causing bearing wear. The connector 24 may be positioned with the socket 27 facing any desired direction to accommodate feed pipes running to the centrifuge from various points, merely by loosening the collar 25 and rotating the connector about its axis, after which the collar is tightened.

The drag above described permits limited lateral movement of guiding member 17 under yielding frictional restraint and thus permits the bearing automatically to position itself coaxial with the axis of rotation of the bowl 21. The guiding member parts are protected against deterioration and wear since the guiding member automatically provides proper lubricant. Moreover, the drag may be readily removed and replaced and the feed nozzle may also be easily and quickly removed and replaced without disturbing the guiding member. As the nozzle 28 projects into the bowl, fresh liquid is delivered without any contamination of the guiding member and free drainage is provided by the chamber 29 and outlet 129. The drainage outlet 129 is centrally arranged and drainage is discharged from substantially the same point of the casing regardless of the arrangement of the connector 24 for the purpose of making pipe connections, and regardless of the final position in which plug 12 comes to rest when screwed tightly into position in the frame.

It is apparent, of course, that various modifications may be made in the above described mechanism without in any way departing from the spirit of the invention as defined in the appended claims.

I claim:

1. In a centrifugal machine, a casing having an aperture, a plug arranged in said aperture, a shell mounted on said plug and having an inturned flange, a guiding member in said shell and capable of limited lateral movement, a centrifugal bowl having a boss extending into said guiding member, and a helical spring arranged to press said guiding member into contact with said flange, said plug having a central feed conduit communicating with said nozzle and an annular discharge conduit leading from the space between said nozzle and said boss and opening to the exterior of said casing in the direction of the axis of said plug.

2. In a centrifugal machine, a casing having an aperture, an annular plug mounted in said aperture, a guide mounted on said plug for restrained lateral movement, a centrifugal bowl having a feed boss extending into said guide, a member detachably connected to said plug, said member having a central conduit terminating in a laterally extending socket, a nozzle carried by said member, said nozzle communicating with said conduit and extending into said boss, and means connecting said member to said plug and permitting adjustment thereof to vary the angular position of said socket.

3. In a centrifugal machine, a centrifugal bowl having a feed boss, a casing provided with an aperture, and a drag assembly positioned in said aperture and comprising a nozzle in alinement with said feed boss and a guide engaging said boss and mounted for restrained lateral movement, and said drag assembly having a downwardly opening drain passage adjacent the axis thereof.

4. In a centrifugal machine, a centrifugal bowl having a feed boss, a casing having an aperture, and a drag assembly having a downwardly extending drain passage, a nozzle in alinement with said boss, a shell having openings leading into said drain passage, and a guide mounted in said shell for restrained lateral movement above said openings.

5. In a centrifugal machine, a casing having an aperture, a plug arranged in said aperture, a guide carried by said plug, a centrifugal bowl having a feed boss extending into said guide, a member detachably secured to said plug and having a drain passage and a feed conduit therein and a nozzle communicating with said feed conduit for directing into said boss substances fed through said conduit, and means for connecting said member to said plug at different rotational positions of said member with respect to said plug.

6. In a centrifugal machine, a casing having an aperture, a plug arranged in said aperture and having an opening there-through, a guide carried by said plug and having an opening in substantial alinement with the opening in said plug, a centrifugal bowl having a feed boss extending into said opening in said guide, and a member removably positioned in said opening in said plug and having a supply passage and a drain passage opening outwardly in the direction of the axis of said member.

7. In a centrifugal machine, a casing having an internally threaded aperture, a threaded plug having an opening therein and adapted to be screwed into said aperture to produce a tight fit with said casing, a guide carried by said plug, a centrifugal bowl having a feed boss extending into said guide, a member having a feed conduit and a drain passage, and means for tightly fitting said member to said plug at different rotational positions of said member with respect to said plug.

8. In a centrifugal machine, a casing having an internally threaded aperture, a threaded plug having an opening therein and adapted to be screwed into said aperture to produce a tight fit with said casing, a guide carried by said plug, a centrifugal bowl having a feed boss extending into said guide, a member having a laterally opening supply conduit and an axially opening drain passage, and means for tightly fitting said member to said plug with the drain passage of said member in communication with the opening in said plug at different rotational positions of said member with respect to said plug.

9. In a centrifugal machine, a casing having an internally threaded aperture, a threaded plug having an opening therein and adapted to be screwed into said aperture to produce a tight fit with said casing, a guide carried by said plug, a centrifugal bowl having a feed boss extending into said guide, a feeding and draining member fitting into the opening in said plug, and means for fitting said member tightly to said plug at different rotational positions of said member with respect to said plug.

In testimony whereof, I have signed my name to this specification.

ARTHUR U. AYRES.